United States Patent [19]
Slavin

[11] Patent Number: 5,612,746
[45] Date of Patent: Mar. 18, 1997

[54] BLOCK MATCHING FOR PICTURE MOTION ESTIMATION USING OFFSET QUANTIZED PIXELS

[75] Inventor: Keith R. Slavin, Aloha, Oreg.

[73] Assignee: Tektronix, Inc., Wilsonville, Oreg.

[21] Appl. No.: 419,561

[22] Filed: Apr. 10, 1995

[51] Int. Cl.⁶ .................................................. H04N 7/24
[52] U.S. Cl. .................................... 348/420; 348/415
[58] Field of Search .................................... 348/420, 416, 348/415, 409, 413, 412, 411, 405, 402, 401, 400, 390, 384, 699, 700, 701; 382/251; 341/200; 358/261.2, 430

[56] References Cited

U.S. PATENT DOCUMENTS

| | | | |
|---|---|---|---|
| 5,091,782 | 2/1992 | Krause et al. | 348/402 |
| 5,440,346 | 8/1995 | Alattar et al. | 348/420 |

*Primary Examiner*—Thai Q. Tran
*Assistant Examiner*—Bryan S. Tung
*Attorney, Agent, or Firm*—Francis I. Gray

[57] ABSTRACT

Block matching for picture motion estimation uses offset quantized pixel values. The pixels of a reference block from a first frame of a video picture sequence are offset quantized to produce a pair of offset quantized reference pixel signals. The pixels of a search area from a next frame of the video picture sequence, corresponding to a current position of the reference block relative to the search area, the search area being larger than the reference block, are quantized to produce a quantized search pixel signal. The quantized search pixel signal is compared with each of the offset quantized reference pixel signals on a pixel by pixel basis to determine whether absolute equality exists between the respective pairs of pixel signals. The comparison results are combined so that for each quantized pixel of the search block that has absolute equality with either offset quantized reference pixel signal, a tally count is incremented. The process is repeated for each possible position of the reference block within the search area, and the portion of the search area having the greatest tally count is deemed to be the new position of the reference block in the second frame. From the new position appropriate motion estimation vectors may be determined.

3 Claims, 2 Drawing Sheets

BLOCK MATCHING FOR PICTURE MOTION ESTIMATION USING OFFSET QUANTIZED PIXELS

BACKGROUND OF THE INVENTION

The present invention relates to moving pictures, and more particularly to block matching for picture motion estimation using offset quantized pixels which provides a more hardware efficient technique for finding a "best fit" between a reference block in one picture frame and a corresponding block in a search area from the next picture frame.

A single monochrome digital video picture frame usually contains a set of sample values describing the luminance values at regular intervals vertically and horizontally within the picture frame. In a sequence of such picture frames any motion between each frame, due to camera panning or zooming, objects moving in the picture, etc., means that a pixel or group of pixels representing an object in one picture frame may have a corresponding set of pixels in the portrayal of the same object at a different position in the next picture frame of the sequence.

Block matching is used to decide where a sampled block of pixels in one picture frame matches most closely to a corresponding block of pixels in the next picture frame. What is desired is an estimate of the motion for each block in one picture frame by obtaining the new position of the corresponding block, if it exists, in the next picture frame. With a limited amount of motion between frames, the search radius may be reduced and, therefore, the amount of computation required.

What is needed is a technique for obtaining a "best fit" between a reference block of one picture frame and a corresponding block in a search area of a next picture frame with the minimum amount of hardware.

SUMMARY OF THE INVENTION

Accordingly the present invention provides block matching for picture motion estimation using offset quantized pixels by finding a "best fit" between a reference block of pixels in one picture frame and a corresponding block of pixels from a search area in the next picture frame. Each pixel in the reference block is offset quantized to produce a pair of offset quantized reference pixel values. Each pixel in the corresponding block of the search area also is quantized to produce a quantized search pixel value. The quantized search pixel value is compared for absolute equality with both of the offset quantized reference pixel values. If there is equality with either offset quantized reference pixel value, a match is indicated and the tally for the reference block is incremented. When all of the pixels of the reference block are processed, the total tally for that position in the search area is stored. The process is repeated for every possible position of the reference block within the search area. The "best fit" block is the position of the reference block within the search area that yields the highest tally.

The objects, advantages and novel features of the present invention are apparent from the following detailed description when read in conjunction with the appended claims and attached drawing.

DESCRIPTION OF THE PREFERRED EMBODIMENT

The first step in block matching according to the present invention is to quantize each pixel sample for both a reference block from a first frame of a video motion picture sequence and a corresponding block in a search area from a second frame of the video motion picture sequence, rounding to the nearest integer based on a given closeness threshold T:

$$Ssearch = RoundToNearest(Psearch/(T)) \quad (1)$$

$$Aref = RoundToNearest(Pref/(T) + \tfrac{1}{2}) \quad (2)$$

$$Bref = Aref - 1 \quad (3)$$

where Ssearch is the quantized pixel value for the corresponding block in the search area, Psearch is the true pixel value for the search area pixel, Aref is a first quantized pixel value for the reference pixel from the reference block, Pref is the true value for the reference pixel, and Bref is a second quantized pixel value for the reference pixel.

Figures 1, 2:
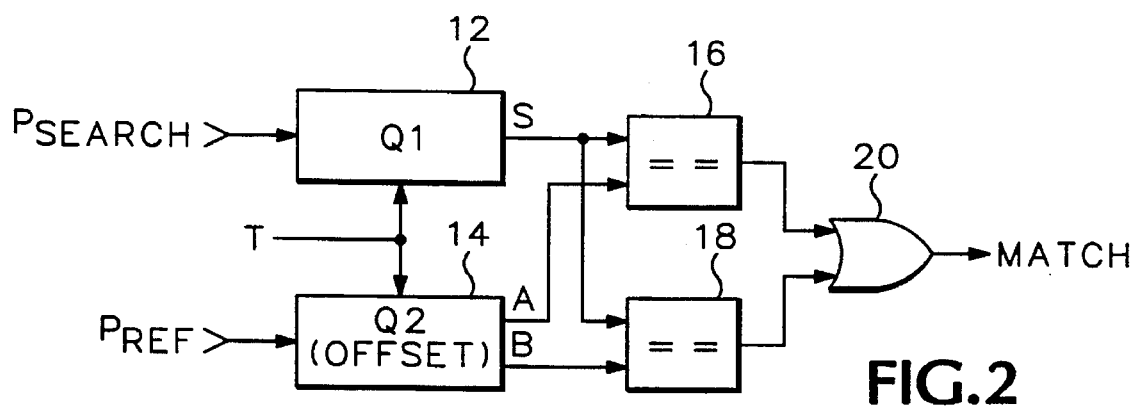
FIG. 1 is an illustration of offset quantizing according to the present invention.
FIG. 2 is a block diagram view of a circuit for block matching using offset quantized pixels according to the present invention.

Referring now to FIG. 1 the values for a search pixel range symmetrically around zero, with the range being a function of the number of bits used to define the pixel value. For T=4 as an example the pixel values according to equation (1) are quantized so that the range of pixel values between −2 and 1 becomes 0, the range of pixel values between −3 and −6 becomes −1, the range of pixel values between 2 and 5 becomes +1, etc. For the first quantized pixel value A for a reference pixel the quantized pixel values according to equation (2) become +1 for the range of 0 to 3, +2 for the range 4 to 7, −1 for the range 0 to −4, etc. For the second quantized pixel value B for the reference pixel according to equation (3) the quantized values become −1 for the range −1 to −4, −2 for the range −5 to −8, 0 for the range 0 to 3, etc. These quantizing operations may be applied to the incoming data stream and, therefore, only are needed at peripheral inputs to the matching process.

Figure 3:
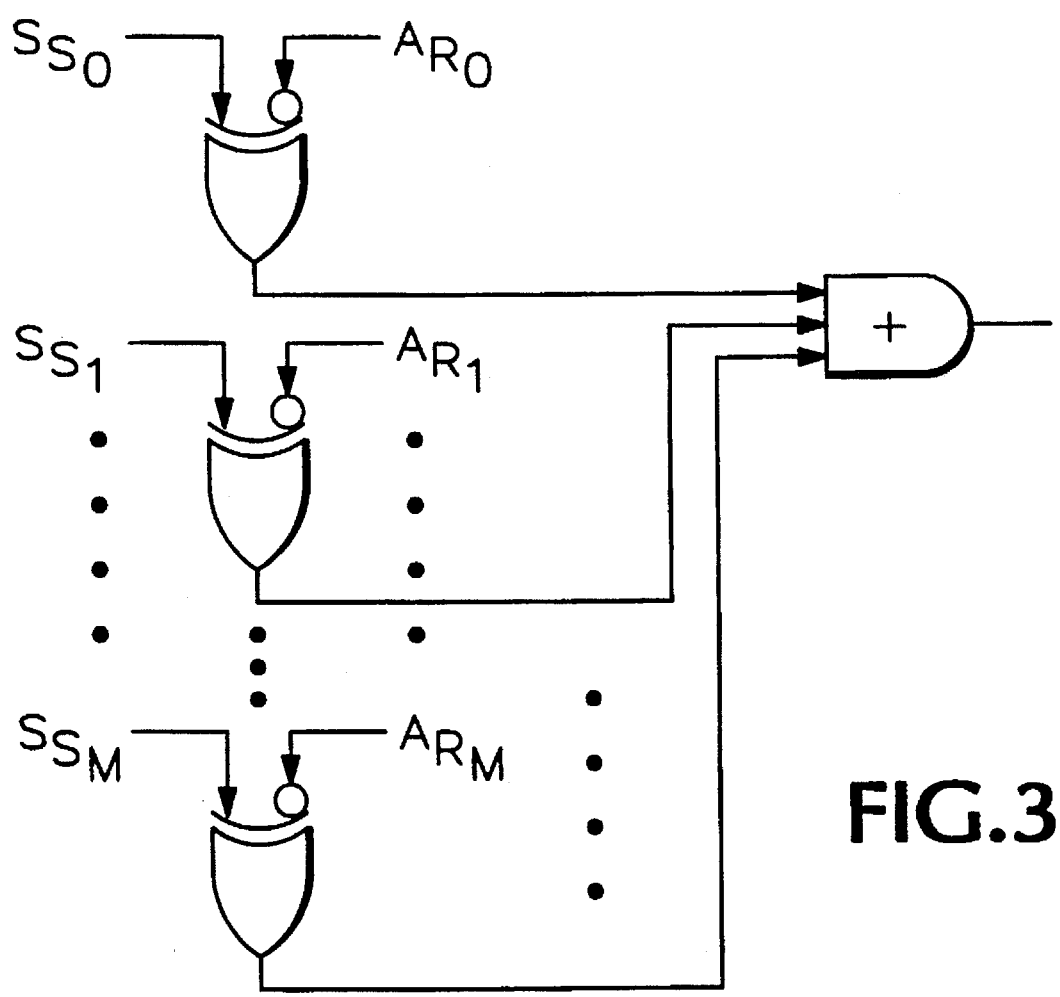
FIG. 3 is a block diagram view of an equality circuit for use in the circuit of FIG. 2 according to the present invention.

For a given reference pixel value the latter two equations (2) and (3) form two bounded regions in which the search pixel value lies for a match. If:

$$-T = (Pref - Psearch) < T \quad (4)$$

then:

$$FIT = (Ssearch == Aref) | (Ssearch == Bref) \quad (5)$$

where "|" is a logical OR function and "==" is a test for equality, i.e., using bitwise exclusive-OR gates into a logical AND gate as shown in FIG. 3. All FIT values obtained for each pixel pair are summed to get a "best fit" tally for the reference block position. The reference block is then moved to another position within the search area and the process is repeated. The values for Aref and Bref may be precalculated before searching over the search area.

As shown in FIG. 2 the search pixel value representing a pixel in the search area corresponding to the reference block being matched is input to a first quantizer 12 that performs the function defined by equation (1) to produce the quantized search pixel S. The corresponding reference pixel value is input to a second offset quantizer 14 that performs the functions defined by equations (2) and (3) to produce the quantized reference pixels A and B. A first equality circuit 16 has as inputs S and A, and a second equality circuit 18 has as inputs S and B. If there is equality of either S and A or S and B, the appropriate equality circuit 16, 18 provides an equality output. The equality outputs from the equality circuits 16, 18 are combined by an OR gate 20 to produce a MATCH output for the search pixel. The MATCH outputs for all the pixels are tallied for the reference block. The total number of tallies for the reference block are stored, and the process is repeated for the next reference block position. Once the reference block has been compared with all possible positions within the search area, the position within the search area with the greatest tally is determined to correspond to the reference block. From this change in position between frames a motion estimation vector may be produced, as is well known in the art.

Although pixel values are used in the above-described process, storage space may be reduced by using the differences between adjacent pixels, horizontally and/or vertically, instead, analogous to obtaining the slope by differentiation for continuous waveforms, so that slope differences are compared between the reference and search blocks. The differences are quantized as described above, rather than the pixels.

Thus the present invention provides block matching for picture motion estimation using offset quantized pixel values.

What is claimed is:

1. A block matching apparatus comprising:

means for offset quantizing pixels within a reference block of pixels from a first frame of a video picture sequence to produce a pair of offset quantized reference pixel signals;

means for quantizing pixels within a corresponding block of pixels in a search area from a second frame of the video picture sequence to produce a quantized search pixel signal, the search area being larger than the reference block; and means for comparing the quantized search pixel signal with each of the offset quantized reference pixel signals on a pixel-by-pixel basis to produce a match signal when the quantized search pixel signal is equal to either of the pair of offset quantized reference pixel signals.

2. The block matching apparatus as recited in claim 1 wherein the comparing means comprises:

a pair of equality circuits each having the quantized search pixel signal as a first input, one of the equality circuits having one of the offset quantized reference pixel signals as a second input and producing a first equality output and the other of the equality circuits having the other of the offset quantized reference pixel signals as a second input and producing a second equality output; and means for combining the first and second equality outputs to produce the match signal.

3. A block matching method comprising the steps of:

offset quantizing pixels within a reference block of pixels from a first frame of a video picture sequence to produce a pair of offset quantized reference pixel signals;

quantizing pixels within a corresponding block of pixels in a search area from a second frame of the video picture sequence to produce a quantized search pixel signal, the search area being larger than the reference block; and comparing the quantized search pixel signal with each of the offset quantized reference pixel signals on a pixel-by-pixel basis to produce a match signal when the quantized search pixel signal is equal to either of the pair of offset quantized reference pixel signals.

* * * * *